United States Patent [19]

Gamberini et al.

[11] Patent Number: 5,058,725
[45] Date of Patent: Oct. 22, 1991

[54] METHOD AND DEVICE FOR SUCCESSIVELY CONVEYING FLAT-SHAPED ITEMS

[75] Inventors: Antonio Gamberini; Mario Spatafora, both of Bologna, Italy

[73] Assignee: G.D Società per Azioni, Pomponia, Italy

[21] Appl. No.: 657,359

[22] Filed: Feb. 18, 1991

Related U.S. Application Data

[63] Continuation of Ser. No. 357,359, May 26, 1989, abandoned.

[30] Foreign Application Priority Data

May 30, 1988 [IT] Italy ................. 3481 A/88

[51] Int. Cl.⁵ ............................................. B65G 47/24
[52] U.S. Cl. ................. 198/406; 414/798.5; 198/612; 198/625
[58] Field of Search ............... 198/406, 625, 612, 614; 414/798.5

[56] References Cited

U.S. PATENT DOCUMENTS

| | | | |
|---|---|---|---|
| 1,971,574 | 8/1934 | Moon | 414/798.5 |
| 2,085,339 | 6/1937 | Smith | 198/625 X |
| 2,104,657 | 1/1938 | Bombard | 414/798.5 |
| 3,107,455 | 10/1963 | Gloor et al. | 198/625 X |
| 3,337,064 | 8/1967 | Mojden et al. | 414/798.5 |
| 3,377,929 | 4/1968 | Ware et al. | 414/798.5 |
| 3,503,486 | 3/1970 | Alexander et al. | 414/798.5 X |
| 3,827,582 | 8/1974 | Lederer | 414/798.5 |
| 4,108,319 | 8/1978 | Kacirek et al. | 198/625 X |
| 4,391,560 | 7/1983 | Fardin | 198/406 |

FOREIGN PATENT DOCUMENTS 2122876 12/1971 Fed. Rep. of Germany ...... 198/406

Primary Examiner—Robert P. Olszewski
Assistant Examiner—James R. Bidwell
Attorney, Agent, or Firm—Marshall, O'Toole, Gerstein, Murray & Bicknell

[57] ABSTRACT

A method and device for successively conveying flat-shaped items, i.e. slab-like items, such as sweets or biscuits, for the formation of groups consisting of a number of items positioned on edge; and whereby the aforementioned items, laid flat, are fed successively on a conveyor to the input of a curved channel extending downwards over an arc of substantially 90°, and along which the items drop in contact with one another. At the output of the curved channel, the items, positioned on edge, are maintained in this position and fed successively and separately to a user device inside respective compartments of a conveyor defined by two tangent, counter-rotating screws.

12 Claims, 3 Drawing Sheets

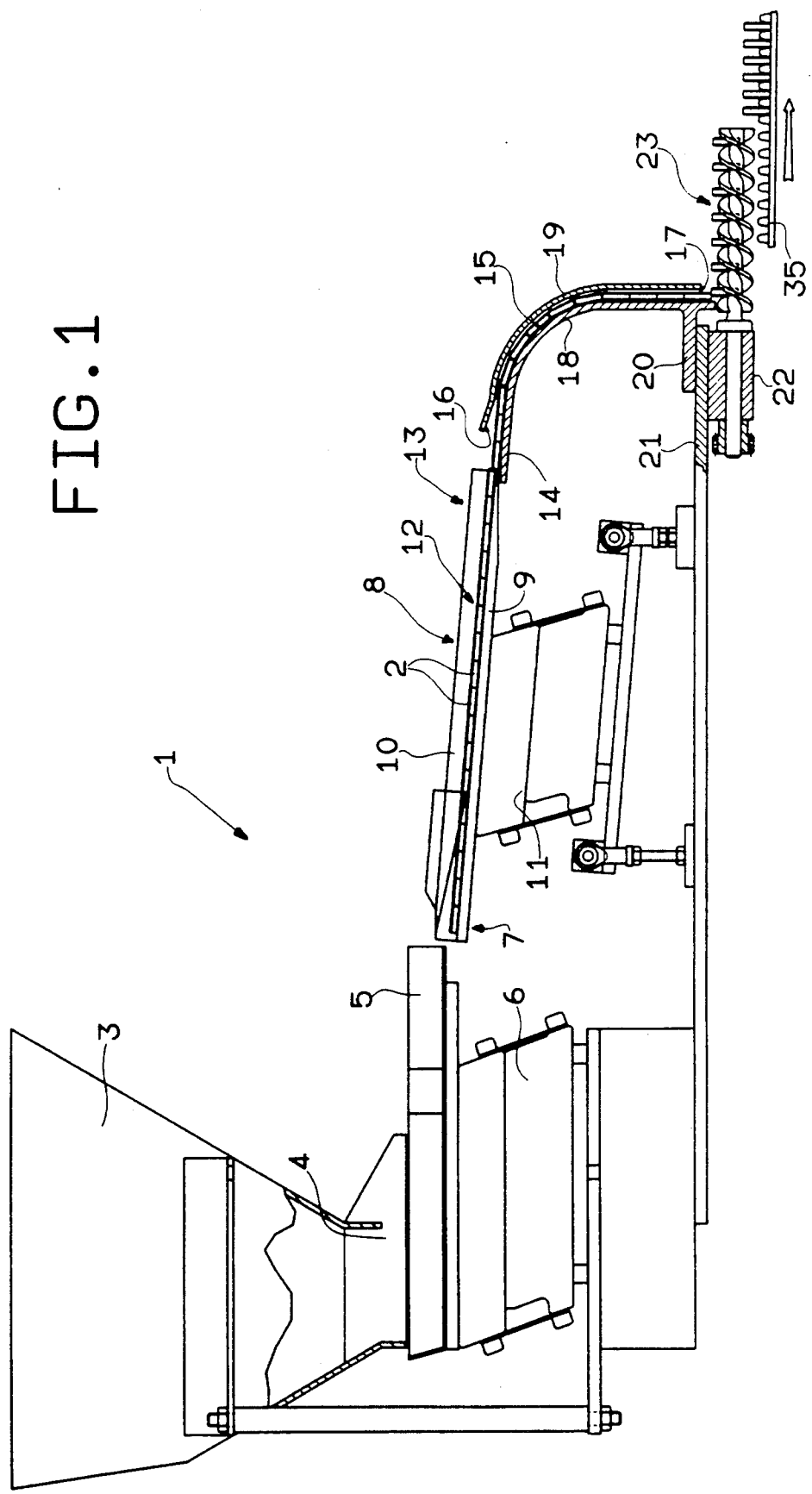

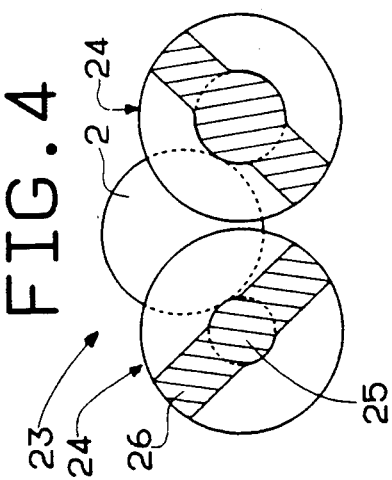
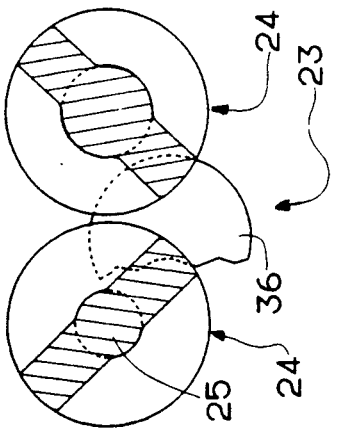
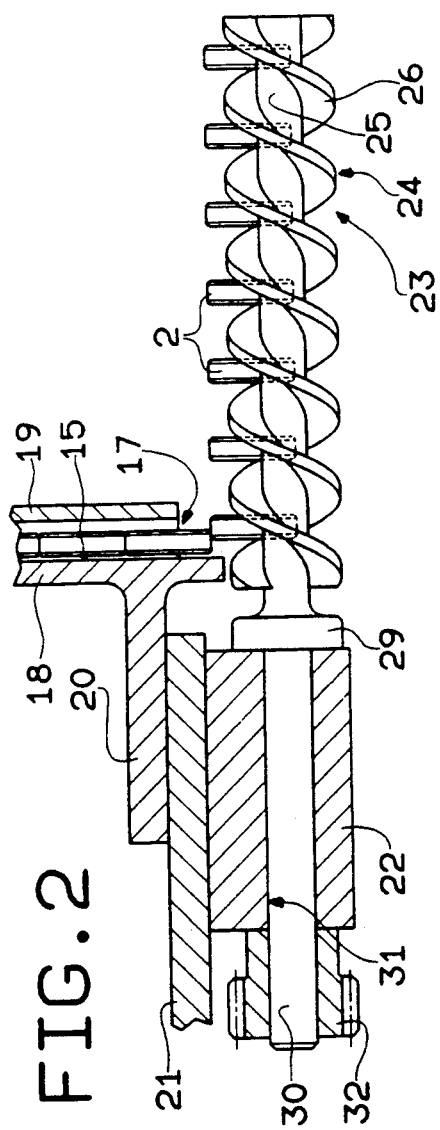
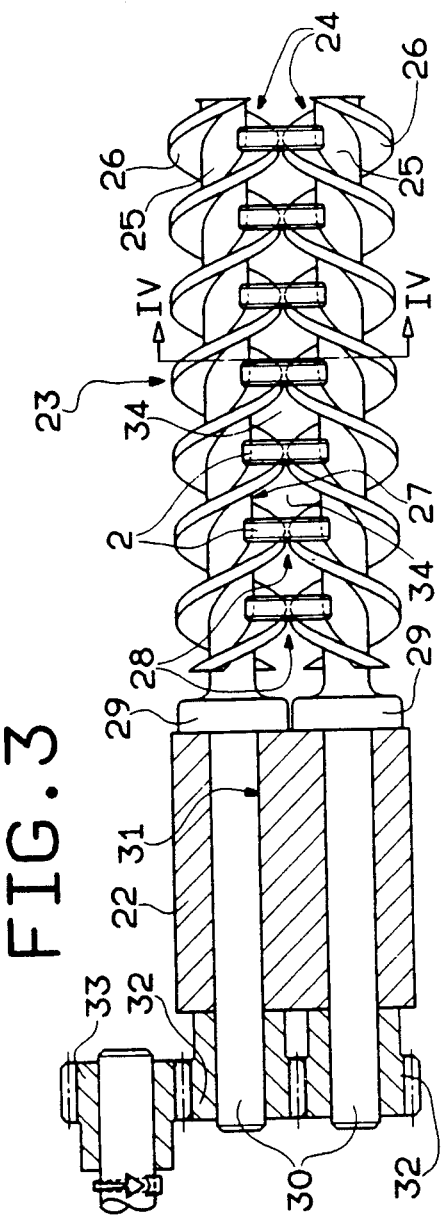

5,058,725

METHOD AND DEVICE FOR SUCCESSIVELY CONVEYING FLAT-SHAPED ITEMS

This application is a continuation of application Ser. No. 07/357,359, filed May 26, 1989, now abandoned.

BACKGROUND OF THE INVENTION

The present invention relates to a method for successively conveying flat-shaped items.

In particular, the present invention relates to a method for successively conveying flat-shaped items for forming groups consisting of a number of said items positioned on edge.

The present invention is particularly suitable for use in the food industry for forming groups of sweets, biscuits or similar upstream from a packing machine. On known production machines employed in the food industry, e.g. for producing sweets, the flat-shaped items coming off the machine are fed in bulk on to a supporting surface, the output end of which communicates with the input end of a conveyor device usually consisting of a vibratory surface sloping slightly downwards and having at least a longitudinal guide extending from said input end to the output end of the vibratory surface. As they travel along said vibratory surface, the items, laid flat, are usually line up contacting said guide, and fed successively to a roll-over device, by which said items are turned substantially 90° on to one edge and fed, in this position, to the input conveyor of a packing machine.

Known roll-over devices currently employed are of two main types. A first usually comprises three reciprocating members consisting of a stop member, an accompanying member, and a supporting member, which provide for turning the items 90° and feeding them succesively, on edge, on to said input conveyor. On the second type of known roll-over device, the roll-over function is performed by a rotary conveyor, by which said items are picked off the vibratory surface and swung 90° on to a withdrawal device by which they are pushed, contacing one another, on to said input conveyor. The reciprocating members employed on said first type of known roll-over device result in a number of drawbacks: high noise level, frequent servicing and low operating speed. Moreover, in the specific case in question, said stop member, which must move in between the items traveling in-line along said vibratory surface, for arresting and enabling one-by-one roll-over of the same, may result in breakage of the items, if these are not fed along said vibratory surface in perfect time with said stop member.

Known devices of the second type provide for solving the aforementioned drawbacks to some extend, but only at the expense of creating other, mainly due to employment of said rotary conveyor. In fact, as said conveyor is designed to swing the items through no more than 90°, the input conveyor on the packing machine must be positioned radially in relation to the rotary conveyor, with the result that, instead of "dropping", the items must be "pushed" on to the input conveyor. This therefore rules out any possibility of employing a straightforward compartment type input conveyor designed to maintain the items on edge, so that the items must be "packed" together on to the input conveyor and maintained in this position by means of complex reciprocating support devices. Such packing of the items usually also prevents any roll-over breakages from being eliminated.

Further drawbacks deriving from said rotary conveyor include difficulties in making even the slightest change in format; and the fact that, as they are being fed off the rotary conveyor on to the input conveyor of the packing machine, said items are left unsupported for a fraction of a second, during which they may easily topple over.

SUMMARY OF THE INVENTION

The aim of the present invention is to provide a method for successively conveying and rolling over flat-shaped items, for forming groups consisting of a number of items positioned on edge, and designed to overcome the aforementioned drawbacks typically associated with known methods.

With this aim in view, according to the present invention, there is provided a method for successively conveying flat-shaped items, for forming groups consisting of a number of said items positioned on edge; said items initially being laid flat on a supporting surface; characterised by the fact that it comprises stages consisting in:

feeding said items, laid flat, along said supporting surface and towards the outlet of the same, via first conveyor means;

turning said items on to one edge, by feeding them along a curved channel extending downwards from said outlet over a substantially 90° arc;

withdrawing said items successively, and at a predetermined rate, from the bottom end of said curved channel, via second conveyor means, and feeding said items successively and separately to a user device.

According to the present invention, there is also provided a device for successively conveying flat slab-like items, for forming groups consisting of a number of said items positioned on edge; said device comprising a supporting surface for said items, laid flat, and first conveyor means for feeding said items, laid flat, along said supporting surface and towards the outlet of the same; characterised by the fact that it also comprises a curved channel extending downwards from said outlet over a substantially 90° arc; and second conveyor means located beneath the bottom end of said curved channel, for feeding said items successively and separately to a user device.

BRIEF DESCRIPTION OF THE DRAWINGS

The invention will be described by way of example with reference to the accompanying drawings, in which:

FIG. 1 shows a schematic, partially-sectioned view of a preferred embodiment of a device in accordance with the teachings of the present invention;

FIG. 2 shows a side view of a detail in FIG. 1;

FIG. 3 shows a plan view of the FIG. 2 detail;

FIG. 4 shows a section along line IV—IV in FIG. 3;

FIG. 5 shows the FIG. 4 section in a given operating position;

DETAILED DESCRIPTION OF THE INVENTION

Figure 6:
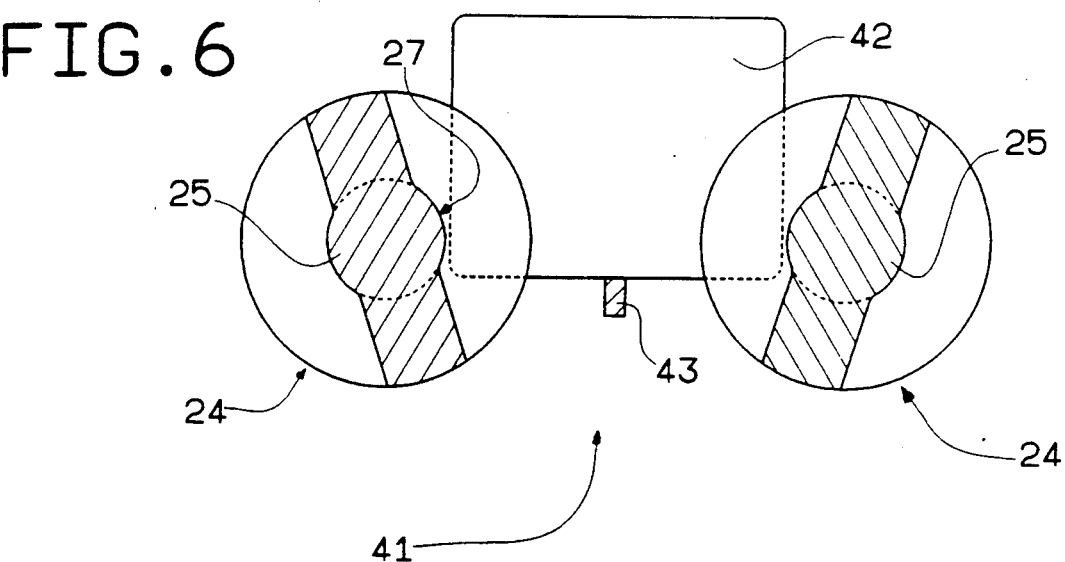
FIG. 6 shows an end view of a variation of the detail in FIGS. 2 to 5.

Number 1 in FIG. 1 indicates a device for conveying and rolling over flat-shaped items consisting, in the example shown of round sweets 2.

Device 1 comprises an input hopper 3 having an outlet 4 designed to feed sweets 2 in bulk on to a surface or tray 5 supported substantially horizontally on a vibratory device 6 by which sweets 2, laid flat and contacting the upper surface of tray 5, are fed towards the output end of tray 5, located over the input end 7 of a vibratory conveyor 8.

Conveyor 8 comprises a substantially flat top plate or surface 9 sloping slightly downwards from input end 7, having two longitudinal ribs 10 on top (only one of which is shown), and supported on a known type of vibratory device 11.

On top of plate 9, said two ribs 10 define a channel 12 for conveying sweets 2 laid flat and contacting one another in a continuous line. The output end 13 of channel 12 is located over a substantially horizontal input surface 14 of a channel 15 curving downwards over an arc of substantially 90°. Said channel 15 presents a substantially horizontal inlet 16 facing output end 13 of channel 12 and designed to receive sweets 2 in the flat position; and an outlet 17 arranged substantially vertically and perpendicular to the axis of channel 12.

Channel 15 constitutes a device for turning sweets 2 from the flat position inside channel 12 into an on-edge position at outlet 17, and is defined by a curved inner plate 18 constituting an extension of surface 14, and by a curved outer plate 19 connected integral with plate 18 via means not shown. Plate 18 presents an inner bracket 20 for connection to bed 21 of device 1, beneath which is provided a block 22 supporting a pocket conveyor 23 extending beneath outlet 17 of channel 15 and substantially parallel to channel 12.

As shown in FIG. 2 and, particularly, FIG. 3, conveyor 23 comprises two screws 24, each comprising a core 25 about which is wound a projection 26 extending substantially radially outwards of core 25 for a distance less than the height of sweets 2. In the FIG. 3 example, said two cores 25 combine to define a channel 27 smaller in width than the diameter of sweets 2, and the outer edges of said two helical projections 26 are substantially tangent over, a number of zones 28 equally spaced along conveyor 23 and presenting the same pitch as the turns of screws 24.

On the end facing block 22, each screw 24 presents a flange 29 from which extends, on the side of flange 29 opposite respective core 25 and coaxial the same, a cylindrical shaft 30 mounted for rotation inside a respective through hole 31 in block 22. On the free end of each shaft 30 projecting from block 22, there is fitted a cylindrical gear 32 meshing with and counter-rotated in relation to the other gear 32 by virtue of a powered drive gear 33.

As shown in FIG. 3, each paif of adjacent, substantially tangent zones 28 defines, along channel 27, a chamber or compartment 34 which, subsequent to counter-rotation of said two screws 24, moves at constant speed from the input end of conveyor 23, located beneath outlet 17 of channel 15, to the other end of conveyor 23. In actual use, once lined up contacting one another along channel 12, sweets 2 are fed successively, by virtue of vibrator 11 which vibrates plate 9, to inlet 16 of channel 15, along which they drop, still contacting one another edge-to-edge in the form of a substantiall upright column, down to outlet 17 of channel 15 which, as already stated, rolls them over 90° from the "flat" position on plate 9 into the "on-edge" position.

As shown in FIG. 1, on reaching outlet 17, each sweet 2 engages a respective pocket 34 on conveyor 23 by which it is carried off at constant speed, thus enabling the next sweet 2 to drop down. Instead of falling down freely into respective pocket 34, however, the next sweet 2, once released by the foregoing one, comes to rest on the edge of projections 26 which, as screws 24 are counter-rotated, gradually move further and further apart, thus enabling sweets 2 to be eased gently and safely inside respective pocket 34. In other words, in addition to defining pockets 34, projections 26 also act as guide cams or profiles for both controlling insertion and preventing sweets 2 from toppling over inside respective pockets 34.

As shown in FIG. 1, sweets 2 are supported on cores 25 (FIG. 4) and fed by conveyor 23, at constant speed and equally spaced by the same pitch as screws 24, to a user device consisting of an input conveyor 35 forming part of a packing machine (not shown).

Such spacing of sweets 2 along conveyor 23 is important for enabling rejection of any damaged sweets 2 which would otherwise be retained by friction, were sweets 2 to be conveyed in "packed" formation. As shown in FIG. 5, any broken sweets 36 inside pockets 34 are off-loaded through channel 27 on to a tray (not shown) underneath; for which purpose, said two cores 25 present slightly different diameters for rotating sweets 2 inside respective pockets 34 and rejecting any broken ones as screws 24 are turned.

Figure 7:
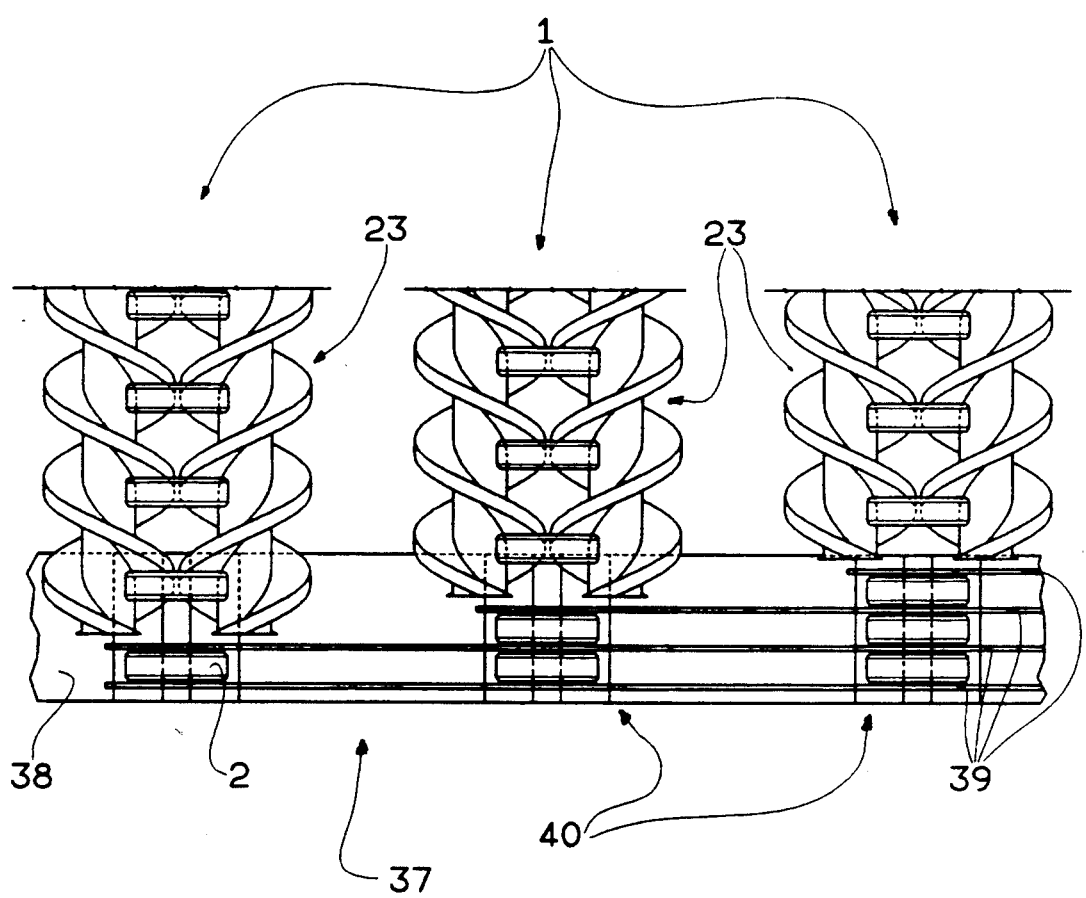
FIG. 7 shows a partial plan view of a series of FIG. 1 in side-by-side parallel arrangement.

A further advantage of spacing sweets 2 along conveyor 23 is that it enables the formation of groups of different types. For example, as shown in FIG. 7, using a series of devices 1 arranged side by side with conveyors 23 parallel, but with the free ends offset by substantially the thickness of one sweet 2, groups 40 of different flavoured sweets 2 may be formed on a user device consisting of a conveyor 37 extending crosswise in relation to conveyors 23 and consisting of a pocket type conveyor 38 with a number of fixed, longitudinal overhead blades 39.

When working with sweets having a substantially square or oval horizontal section (not shown), conveyor 23 is replaced by a conveyor 41 (FIG. 6) wherein cores 25 of said two screws 24 are spaced in such a manner as to produce a channel 27 wider than the sweets (numbered 42). In this case, instead of resting on cores 25 as they are fed along conveyor 41, sweets 42 rest on a supporting element 43 extending along channel 27 and of such a width as to still enable rejection of any damaged sweets 42.

An important feature of device 1 as described above in that any change is format may usually be made by simply changing screws 24.

Though employed in the above description for conveying and rolling over sweets, device 1 may, of course be employed to advantage for conveying and rolling over various types of flat-shaped items, such as biscuits chocolate bars, packets of cigarettes, etc..

We claim:

1. A method for successively conveying flat-shaped items, for forming groups consisting of a number of said items positioned on edge, said items initially being laid flat on a supporting surface, comprising:

feeding said items (2), laid flat, along said supporting surface (9) and towards an outlet of the same, via a first conveyor means (8);

turning said items (2) on to one edge by feeding them along a curved rigid channel (15) in a stationary position and extending downwards from said outlet over a substantially 90° arc;

the channel (15) including two opposing spaced apart curved plates (18,19) in stationary position;

the items (2) dropping along said curved rigid channel (15) while contacting one another edge to edge;

withdrawing said items (2) successively, and at a predetermined rate, from the bottom end of said curved rigid channel (15), via a second conveyor means (23), and feeding said items (2) successively and separately to a user device (35 or 37).

2. A method as claimed in claim 1, characterised by the fact that said second conveyor means (23) comprise a series of pockets (34) each designed to receive a respective said item (2) positioned on edge, and to maintain said item (2) in said position; each said item (2) being controlled by said second conveyor means (23) as it drops down from the bottom end of said curved channel (15) into a respective said pocket (34).

3. A method as claimed in claim 2, characterised by the fact that said items (2) are fed to said user device (35 or 37) by means of two counter-rotating screws (24) defining said second conveyor means (23); each pair of adjacent turns on each of said two screws (24) combining to define a said pocket (34), and the outer edge of said turns defining an inclined movable profile (26) supporting each said item (2) as it is fed inside a respective said pocket (34).

4. A device for successively conveying flat slablike items (2) for forming groups consisting of a number of said items (2) positioned on edge; said device (1) comprising:

a supporting surface (9) on which said items (2) can be laid flat, and first conveyor means (8) capable of feeding said items (2), laid flat, along said supporting surface (9) and towards an outlet of the same;

a curved rigid channel (15) in stationary position communicating with and extending downwards from said outlet over a substantially 90° arc, the channel (15) including two opposing spaced apart curved plates (18,19) in stationary position whereby said items (2) can leave the supporting surface (9) and enter the curved rigid channel (15), with the curved rigid channel being capable of turning the items (2) on to one edge as the items (2) drop along the curved rigid channel (15) while contacting one another edge to edge; and second conveyor means (23), located beneath the bottom end of said curved rigid channel (15), capable of receiving said items (2) successively, and at a predetermined rate, from the bottom end of said curved rigid channel (15) and then mechanically feeding said items (2) along but lateral to a longitudinal path successively and separated from adjacent items (2) to a user device (35 or 37).

5. A device as claimed in claim 4, characterised by the fact that said second conveyor means (23) comprise a series of pockets (34) each designed to receive a respective said item (2) positioned on edge, and to maintain said item (2) in said position; guide means (26) being provided on said second conveyor means (23) for controlling each said item (2) as it drops down from the bottom end of said curved channel (15) into a respective said pocket (34).

6. A device as claimed in claim 5, characterised by the fact that said second conveyor means (23) comprise two counter-rotating screws (24); each said screw (24) comprising a center core (25) and at least an outer projection (26) shorter in height than said items (2) and wound about said center core (25) in such a manner as to form a number of successive turns along the same; each pair of adjacent turns on each of said two screws (24) combining to define a said pocket (34), and said guide means comprising inclined, movable profiles (26) defined by the outer edge of said projections; said profiles (26) supporting each said item (2) as it is fed inside a respective said pocket (34).

7. A device as claimed in claim 6, characterised by the fact that said cores (25) are separated by a distance greater than the width of said items (2); the outer edges of said projections (26) on said two screws (24) combining to define a space, and a supporting element (43) for said items (2) extending along said space between said two screws (24).

8. A device for successively conveying flat slab-like items (2), for forming groups consisting of a number of said items (2) positioned on edge;

the device (1) comprising a supporting surface (9) for said items (2), laid flat;

first conveyor means (8) for feeding items (2), laid flat, along said supporting surface (9) and towards an outlet of the same;

a curved channel (15) extending downwards from said outlet over a substantially 90° arc and with the channel having a bottom end;

second conveyor means (23) located beneath the bottom end of the curved channel (15) for feeding the items (2) successively and separately to a user device (35 or 37);

the second conveyor means (23) comprising a series of pockets (34) each designed to receive a respective said item (2) positioned on edge, and to maintain said item (2) in said position;

guide means including projections (26) on the second conveyor means (23) for controlling each item (2) as it drops down from the bottom end of said curved channel (15) into a respective pocket (34);

the second conveyor means (23) comprising two counter-rotating screws (24); each said screw (24) comprising a center core (25) having a different diameter than the core of the other screw and at least an outer projection (26) shorter in height than the items (2) and wound about the center core (25) so as to form a number of successive turns along the same;

each pair of adjacent turns on each of the two screws (24) combining to define a pocket (34); and the guide means comprising inclined, movable profiles on the projections (26) defined by the outer edge of the projections; the movable profiles (26) supporting each said item (2) as it is fed inside a respective said pocket (34).

9. A method for successively conveying flat-shaped items, for forming groups consisting of a number of said items positioned on edge, said items initially being laid flat on a supporting surface, comprising:

feeding said items (2), laid flat, along said supporting surface (9) and towards an outlet of the same, via a first conveyor means (8);

turning said items (2) on to one edge by feeding them along a curved rigid stationary channel (15) extending downwards from said outlet over a substantially 90° arc and terminating in a lower end;

the channel (15) including two opposing spaced apart curved plates (18,19) in stationary position;

moving the items (2) along said curved channel (15) while contacting one another edge-to-edge to form a substantially upright column of said items positioned edge-to-edge with only the lowermost item in the column being beyond the lower end of the channel (15) but with the lowermost item having its bottom edge supported by a second conveyor means;

withdrawing said items (2) one at a time but successively at a predetermined rate from the bottom of the column by moving the lowermost item (2) lateral to the column by means of the second conveyor means (23) while the lowermost item (2) is in edge-to-edge contact with an item (2) above it until the lowermost item (2) is displaced laterally from the column and the next above item (2) in the column drops down into the lowermost position, then moving the lowermost item (2) laterally as described and repeating such lateral movement of each successive item (2) when it drops into the lowermost position; and by means of the second conveyor feeding said items (2) successively to a user device (35 or 37).

10. A method for successively conveying flat-shaped items, for forming groups consisting of a number of said items positioned on edge, said items initially being laid flat on a supporting surface, comprising:

feeding said items (2), laid flat, along said supporting surface (9) and towards an outlet of the same, via a first conveyor means (8);

turning said items (2) on to one edge by feeding them along a curved rigid stationary channel (15) extending downwards from said outlet over a substantially 90° arc and terminating in a lower end;

the channel (15) including two opposing spaced apart curved plates (18,19) in stationary position spaced apart a substantially constant distance and with said substantially constant distance being slightly greater than the distance needed for the items to travel through the channel in edge-to-edge relationship;

moving the items (2) along said curved channel (15) while contacting one another edge-to-edge to form a substantially upright column of said items positioned edge-to-edge with only the lowermost item in the column being beyond the lower end of the channel (15) but with the lowermost item having its bottom edge supported by a second conveyor means;

withdrawing said items (2) one at a time but successively and at a predetermined rate from the bottom of the column by moving the lowermost item (2) lateral to the column by means of the second conveyor means (23) while the lowermost item (2) is in edge-to-edge contact with an item (2) above it, thereby supporting and holding the column momentarily stationary until the lowermost item (2) is displaced laterally from the column and the next-above item (2) in the column drops down into the lowermost position, then moving the lowermost item (2) laterally as described and repeating such lateral movement of each successive item (2) when it drops into the lowermost position; and by means of the second conveyor feeding said items (2) successively, separately and uniformly spaced apart to a user device (35 or 37).

11. A device for successively conveying flat slab-like items (2) for forming groups consisting of a number of said items (2) positioned on edge; said device (1) comprising:

a supporting surface (9) for said items (2), laid flat, and first conveyor means (8) for feeding said items (2) laid flat along said supporting surface (9) and towards an outlet of the same;

a curved rigid stationary channel (15) extending downwards from said first conveyor outlet over a substantially 90° arc;

the channel (15) including two opposing spaced apart rigid curved plates (18,19) in stationary position but spaced apart a substantially constant distance and with said substantially constant distance being slightly greater than the distance needed for the items to travel through the channel and be maintained in edge-to-edge relationship while contacting one another edge-to-edge to form a substantially upright column of said items positioned edge-to-edge with only the lowermost item in the column being beyond the lower end of the channel (15); and a second conveyor means (23) for withdrawing said items (2) one at a time, but successively and at a predetermined rate, from the bottom of the column by moving the lowermost item (2) lateral to the column while the item (2) is in edge-to-edge contact with the item (2) next-above it and while the item (2) is also in contact with the second conveyor means to displace the item (2) from the column whereby the next-above item (2) in the column can drop down into the lowermost position in contact with the second conveyor means, and the second conveyor means can then move it laterally as described and the operation repeated for each successive item (2) when it drops into the lowermost position whereby the second conveyor means can feed said items (2) successively and separately to a user device (35 or 37).

12. A device for successively conveying flat slab-like items (2) for forming groups consisting of a number of said items (2) positioned on edge; said device (1) comprising:

a supporting surface (9) for said items (2), laid flat, and first conveyor means (8) for feeding said items (2), laid flat, along said supporting surface (9) and towards an outlet of the same;

a curved rigid stationary channel (15) extending downwards from said outlet over a substantially 90° arc;

the channel (15) including two opposing spaced apart rigid curved plates (18,19) in stationary position but spaced apart a constant distance and with said constant distance being slightly greater than the distance needed for the items to travel through the channel and be maintained in edge-to-edge relationship while contacting one another edge-to-edge to form a substantially upright column of said items positioned edge-to-edge with only the lowermost item in the column being beyond the lower end of the channel (15);

second conveyor means (23) located beneath the lower end of the curved channel (15) for feeding the items (2) successively, separately and uniformly spaced apart to a user device (35 or 37);

the second conveyor means (23) comprising a series of pockets (34) each designed to receive a respective said item (2) positioned on edge, and to maintain said item (2) in said position;

the second conveyor means (23) having two counter-rotating screws (24); each said screw (24) comprising an outer projection (26) shorter in height than the items (2) and wound about the center core (25) so as to form a number of successive turns along the same;

each pair of adjacent turns on each of the two screws (24) combining to define a pocket (34); and the second conveyor means (23) being able to withdraw said items (2) one at a time but successively and at a predetermined rate from the bottom of the column and deposit each item (2) in a pocket (34) by moving the lowermost item (2) lateral to the column while the item (2) is in edge-to-edge contact with the item (2) next-above it to displace the lowermost item (2) from the column and deposit it in a pocket (34) and have the next item (2) in the column drop down into the lowermost position, whereby the second conveyor means can move the item (2) laterally as described and by repeating the operation successive items (2) can be dropped into the lowermost position, whereby the second conveyor means can feed said items (2), after being deposited in a pocket (34), successively, separately and uniformly spaced apart to a user device (35 or 37).

* * * * *